United States Patent
Furukawa et al.

(10) Patent No.: US 8,614,777 B2
(45) Date of Patent: Dec. 24, 2013

(54) LIQUID CRYSTAL DISPLAY DEVICE

(75) Inventors: Tomoo Furukawa, Osaka (JP); Katsuya Ogawa, Osaka (JP); Masaaki Saitoh, Osaka (JP); Kazuyoshi Fujioka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 327 days.

(21) Appl. No.: 13/058,513

(22) PCT Filed: May 18, 2009

(86) PCT No.: PCT/JP2009/059140
§ 371 (c)(1),
(2), (4) Date: Feb. 10, 2011

(87) PCT Pub. No.: WO2010/021179
PCT Pub. Date: Feb. 25, 2010

(65) Prior Publication Data
US 2011/0141414 A1    Jun. 16, 2011

(30) Foreign Application Priority Data
Aug. 20, 2008   (JP) .................................. 2008-211778

(51) Int. Cl.
*G02F 1/1335*    (2006.01)

(52) U.S. Cl.
USPC ........................................................ 349/114

(58) Field of Classification Search
None
See application file for complete search history.

(56) References Cited

U.S. PATENT DOCUMENTS

| | | |
|---|---|---|
| 7,106,405 B2 | 9/2006 | Okumura |
| 7,433,005 B2 | 10/2008 | Yoshida et al. |

(Continued)

FOREIGN PATENT DOCUMENTS

| | | |
|---|---|---|
| CN | 1416004 A | 5/2003 |
| JP | 2003-149647 A | 5/2003 |

(Continued)

OTHER PUBLICATIONS

Applicants bring the attention of the Examiner to the following pending U.S. Appl. No. 13/120,391, filed Mar. 22, 2011, published as US2011-0169722A1 which is a national stage of PCT application No. PCT/JP2009/059590 published as WO2010/038507.

(Continued)

*Primary Examiner* — Thanh-Nhan P Nguyen
(74) *Attorney, Agent, or Firm* — Chen Yoshimura LLP

(57) ABSTRACT

The present invention provides a semi-transmissive liquid crystal display device that presents excellent display quality in the reflective display, and that can be easily applied to high definition. The liquid crystal display device of the present invention includes a first substrate, a liquid crystal layer, and a second substrate, in this order. The first substrate has pixel electrodes having a structure composed of a trunk portion and a plurality of branch portions that branch off from the trunk portion. The liquid crystal display device has a display region that includes a region where the branch portions and slits are alternately disposed. The display region has a reflective region and a transmissive region. The reflective region has a pixel electrode, a reflective film disposed under the pixel electrode, and a λ/4 retarder plate. The first best-fit curve, which is obtained from the gamma curve of the reflective display, is above the second best-fit curve, which is obtained from the gamma curve of the transmissive display, except in the regions where the reflectance of the first best-fit curve and the transmittance of the second best-fit curve are both 0% and 100%. The first best-fit curve does not have a gradation reversal and has an inflection point.

20 Claims, 7 Drawing Sheets

(56) References Cited

U.S. PATENT DOCUMENTS

| | | |
|---|---|---|
| 7,486,351 B2 | 2/2009 | Itou et al. |
| 8,319,921 B2 | 11/2012 | Saitoh et al. |
| 2003/0043336 A1 | 3/2003 | Sasaki et al. |
| 2003/0112213 A1 | 6/2003 | Noguchi et al. |
| 2004/0105059 A1 | 6/2004 | Ohyama et al. |
| 2004/0165129 A1 | 8/2004 | Okumura |
| 2004/0233360 A1 | 11/2004 | Yoshida et al. |
| 2005/0001959 A1 | 1/2005 | Chang |
| 2005/0110928 A1 | 5/2005 | Sonoda et al. |
| 2005/0264730 A1 | 12/2005 | Kataoka et al. |
| 2005/0270447 A1 | 12/2005 | Tasaka et al. |
| 2006/0055852 A1 | 3/2006 | Yoshida et al. |
| 2006/0125755 A1 | 6/2006 | Noguchi et al. |
| 2006/0187387 A1 | 8/2006 | Ohyama et al. |
| 2006/0244881 A1 | 11/2006 | Sasaki et al. |
| 2007/0046606 A1 * | 3/2007 | Kim et al. ................. 345/90 |
| 2008/0079876 A1 | 4/2008 | Oka et al. |
| 2010/0035504 A1 | 2/2010 | Sasaki et al. |
| 2011/0037914 A1 | 2/2011 | Noguchi et al. |
| 2011/0169722 A1 | 7/2011 | Ogawa et al. |

FOREIGN PATENT DOCUMENTS

| | | | |
|---|---|---|---|
| JP | 2003157052 A | * | 5/2003 |
| JP | 2003-315766 A | | 11/2003 |
| JP | 2003-322857 A | | 11/2003 |
| JP | 2004-198920 A | | 7/2004 |
| JP | 2004-302174 A | | 10/2004 |
| JP | 2004-341524 A | | 12/2004 |
| JP | 2005-181981 A | | 7/2005 |
| JP | 2005-338472 A | | 12/2005 |
| JP | 2005-345757 A | | 12/2005 |
| JP | 2006-78890 A | | 3/2006 |
| JP | 2007-322639 A | | 12/2007 |
| JP | 2008-83610 A | | 4/2008 |
| WO | 2010/038507 A1 | | 4/2010 |

OTHER PUBLICATIONS

International Search Report (ISR) issued in PCT/JP2009/059590 (International application of the related U.S. Appl. No. 13/120,391 mentioned above) mailed in Jul. 2009 for Examiner consideration, citing U.S. Patent Application Publication Nos. 1-2, 4-6 and 8 and Foreign Patent document Nos. 1-6 listed above.

International Search Report (ISR) issued in PCT/JP2009/059140 (International application) mailed in Jun. 2009 for Examiner consideration, citing U.S. Patent Application Publication Nos. 5-7 and Foreign Patent document Nos. 3-6 listed above.

U.S. Appl. No. 12/935,127, filed Sep. 28, 2010.

International Search Report (ISR) issued in PCT/JP2009/052919 (of the related U.S. Appl. No. 12/935,127) mailed in Apr. 2009.

* cited by examiner

LIQUID CRYSTAL DISPLAY DEVICE

TECHNICAL FIELD

The present invention relates to a liquid crystal display device. More particularly, the present invention relates to a semi-transmissive liquid crystal display device.

BACKGROUND ART

Liquid crystal display devices, which are thin, lightweight, and have low-power consumption, are used in a wide variety of applications such as monitors, projectors, portable phones, and portable digital assistant (PDA). As the types of the liquid crystal display devices, the transmissive type, the reflective type, and the semi-transmissive type (which performs both reflective and transmissive displays) have been known. In the transmissive type liquid crystal display devices, the light from the internal light source, such as a backlight, which is located behind the liquid crystal display panel, is guided from behind into the liquid crystal display panel, and then to the outside of the panel to display images. In reflective type liquid crystal display devices, external light or light from a front light source is guided to an interior of the liquid crystal display panel from the front (the viewer's side) and is reflected there to display images. The semi-transmissive type liquid crystal display devices primarily perform a transmissive display utilizing the light from the backside, and in addition, perform a reflective display utilizing light from the front when placed in an environment with high ambient light intensity, such as outdoors. Thus, the display characteristics of semi-transmissive type liquid crystal display devices, which have display properties of both the transmissive liquid crystal display device and the reflective liquid crystal display device, are less likely to be influenced by the external light conditions, and therefore superior display characteristics can be maintained in a wide range of environments.

In these semi-transmissive type liquid crystal display devices, the number of times the light passes through the liquid crystal layer is different between the transmissive display and the reflective display. Therefore, when the cell thicknesses of the transmissive region and the reflective region are set to be about the same, the effective retardations of the transmissive region and the reflective region are different. Thus, the gamma characteristics of the transmissive display and the gamma characteristics of reflective display do not match, causing a reversal of the gamma characteristics of the reflective display, which results in abnormal image display. In order to maintain good visibility for both the transmissive and reflective displays, a multi-gap structure in which the cell thickness in the reflective region is made about a ½ of the cell thickness in the transmissive region is generally known.

On the other hand, multi-domain vertical alignment liquid crystal display devices (hereinafter "MVA-LCDs") in which liquid crystal with a negative dielectric constant anisotropy is vertically aligned and in which banks (linear protrusions) and electrode openings (slits) are provided on a substrate as orientation control means have been known.

In MVA-LCDs, the orientation of liquid crystal is controlled by slit openings formed in the electrodes and/or dielectric protrusions formed over the electrodes. When MVA-LCDs are used as semi-transmissive display devices, the area of the openings in the electrode and/or the surface area occupied by the protrusions on the substrate in the reflective region are made larger than the area of the openings in the electrode and/or the surface area occupied by the protrusions on the substrate in the transmissive region. This way, less voltage is applied to the liquid crystal layer in the reflective region than in the transmissive region, and consequently, the electrooptical properties of the reflective display can be matched to the electrooptical properties of the transmissive display (see, e.g., Patent Document 1).

In MVA-LCDs, however, the openings and protrusions employed as means to control the alignment cause a lowered aperture ratio. Low aperture ratio result in a low white luminance and darker image. This means that for MVA-LCDs, it is difficult to achieve high definitions, which require smaller pixel sizes. In this respect, the technology needs to be improved.

A technique for controlling the orientation of liquid crystal by means other than the openings and the protrusions are also known. This technique provides pretilt angles to liquid crystals using polymers (e.g., see Patent Document 2). In the technique where polymers are used for providing a pretilt angle to the liquid crystal, polymerizable components such as monomers and oligomers are mixed in the liquid crystal material, and the mixture is sealed between two substrates. The polymerizable components are polymerized while a voltage is applied across the substrates to keep the liquid crystal molecules tilted. This technique provides a liquid crystal layer having the liquid crystal molecules which are tilted to a predetermined direction upon voltage application. It should be noted that FIG. 4 of Patent Document 2 discloses a liquid crystal display device using a striped electrode having 3 µm-wide electrodes and a 3 µm-wide spaces.

RELATED ART DOCUMENTS

Patent Documents

Patent Document 1: Japanese Patent Application Laid-Open Publication No. 2004-198920

Patent Document 2: Japanese Patent Application Laid-Open Publication No. 2003-149647

SUMMARY OF THE INVENTION

Problems to be Solved by the Invention

The present invention was devised in consideration of the current situation in the field as described above, and is aimed at providing a semi-transmissive type liquid crystal display device that can provide excellent display quality in the reflective display and that can be used for high definition.

Means of Solving the Problems

In the quest for a semi-transmissive type liquid crystal display device that provides excellent display quality in the reflective display and that can be used in high image definition, the inventors of the present invention considered the shape of the pixel electrode and the gamma curve of the reflective display. The inventors have discovered that, by employing an electrode having a structure constructed of a trunk portion and branch portions and by using a display mode in which a region where the branch portions of the electrode and slits are alternately disposed is used as a display region, the surface area occupied by the orientation control means can be reduced, the aperture ratio is improved, and application to higher image definition becomes possible. The inventors also discovered that if a first best-fit curve, which is obtained from the gamma curve of the reflective display, is set above a second best-fit curve, which is obtained from the gamma curve of the transmissive display, and if the first best-fit curve has an inflection point, the reflective display, which is darker than the display in the transmissive display, can be made brighter in the middle gradation range. The brighter image in the reflective display makes less noticeable differences in display quality due to the present or absence of the ambient light. As a result, the above-mentioned problems are admirably solved, leading to the present invention.

That is, the present invention provides a liquid crystal display device including a first substrate, a liquid crystal layer, and a second substrate, in this order, in which the first substrate has pixel electrodes having a structure composed of a trunk portion and a plurality of branch portions that branch off from the trunk portion. The liquid crystal display device has a display region that includes areas where the branch portions of the pixel electrode and slits are alternately disposed, and the display region includes a reflective region and a transmissive region. The reflective region has a pixel electrode, a reflective film disposed under the pixel electrode, and a λ/4 retarder plate. A first best-fit curve, which is obtained from the gamma curve of the reflective display is set above a second best-fit curve, which is obtained from the gamma curve of the transmissive display, except in the regions where the reflectance of the first best-fit curve and the transmittance of the second best-fit curve are both 0% and 100%. The first best-fit curve does not have a gradation reversal, and has an inflection point.

The present invention is described in detail below.

The aforementioned first substrate has pixel electrodes having a structure composed of a trunk portion and a plurality of branch portions branching off from the trunk portion. Pixel electrodes, provided for each pixel, are used to apply voltage to the liquid crystal layer. Pixel electrodes of such structure are called fishbone-shaped electrodes. In a preferred structure of the pixel electrode, a cross-shaped trunk portion divides the pixel into four regions, and a plurality of branch portions extend from the trunk portion in each region. For better viewing angle properties, when the cross-shaped trunk portion extends at angles of 0°, 90°, 180°, and 270°, the pixel is preferably constituted by a region in which the branch portions extend at an angle of 45°, a region in which the branch portions extend at an angle of 135°, a region in which the branch portions extend at an angle of 225°, and a region in which the branch portions extend at an angle of 315°.

The liquid crystal display device of the present invention has display regions that include areas in which the branch portions and slits (the areas where the pixel electrode is not formed) are alternately disposed. For the perspective of stabilizing the orientation of the liquid crystal molecules by using the fishbone type electrodes alone on the first substrate without using any orientation control means on the second substrate, the width of the branch portions in the area in which the branch portions and slits are alternately disposed is preferably 5 μm or less, and the width of the slits is preferably 5 μm or less.

The aforementioned display region includes a reflective region and a transmissive region. The transmission region is the area contributing to the transmissive display, and the reflective region is the area contributing to the reflective display. That is, the light used for the transmissive display passes through the liquid crystal layer in the transmissive region, and the light used for the reflective display passes through the liquid crystal layer in the reflective region. The aforementioned reflective region has a pixel electrode, a reflective film disposed under the pixel electrode, and a λ/4 retarder plate. The aforementioned λ/4 retarder plate, which is a phase difference plate having an optically anisotropy designed to cause an optical path difference of λ/4 between two polarized light components oscillating in mutually orthogonal directions, converts a linearly polarized light to a circularly polarized light and converts a circularly polarized light to a linearly polarized light, and is used for the reflective display. The λ/4 retarder is provided at least in the reflective region, and may be provided in the transmissive region. The λ/4 retarder may be disposed, for example, between the liquid crystal layer and the polarizer and in both the transmissive region and the reflective region.

The trunk portion of the pixel electrode is preferably disposed in the reflective region. For example, in an embodiment in which the trunk portion of the pixel electrode divides the pixel into four regions, and a plurality of branch portions extend in these four regions, the orientation directions of liquid crystals in these regions are all different, and the regions where the trunk portion is provided serve as a divider, creating four regions having liquid crystal oriented in respectively different directions. Therefore, in the region where the trunk portion is disposed, the orientation of liquid crystals tends to be unstable, which may cause surface roughness in the displayed image. In general, the reflective display is not designed to meet a high display quality standard unlike the transmissive display. Thus, even if the trunk portion is used for the reflective region instead of being shielded from light, adverse influence on the display quality can be minimized. This way, the aperture ratio can be improved.

The aforementioned reflective film must be disposed under the pixel electrode in the areas corresponding to the slits of the pixel electrode, but the reflective film may be disposed over the pixel electrode in the areas corresponding to the trunk portion and branch portions of the pixel electrode. By forming the reflective film over the pixel electrode, the light passage for the reflective display can be shortened, which improves the reflectance.

The aforementioned first and second best-fit curves are obtained by fitting the parameters of appropriate theoretical curves to the measured data of the reflective and transmissive display gamma curves, respectively. In this specification, a gradation reversal is considered to be absent when the first best-fit curve monotonically increases over the range of 0 to 100 percent of reflectance. Furthermore, the number of inflection points that the first best-fit curve may have is not specifically limited; the curve may have only one inflection point or multiple inflection points. The gamma curve represents the relationship between the output property (luminance) and input property (gradation) of the liquid crystal display device. Usually, the output property is indicated on the vertical axis and the input property is indicated on the horizontal axis.

The inflection point is a point in a curve such that in either one of a neighborhood infinitely close to the point on the low luminance gradation side and a neighborhood infinitely close to the point on the high luminance gradation side, the curve is convex up where the second derivative is always negative, and in the other one of such neighborhoods, the curve is convex down where the second derivative is always positive. Here, the second derivative may not exist at the inflection point, and if the second derivative exists, it is zero.

For improved display quality in the reflective display, the reflective region of the liquid crystal display device of the present invention preferably has a portion whose cell thickness is substantially equal to the cell thickness of the transmissive region. This embodiment, which does not employ a multi-gap structure in which the cell thickness of the reflective region is half the cell thickness of the transmissive region, is advantageous over the multi-gap structure, since its manufacturing process is simpler. The embodiment in which the multi-gap structure is not employed is also advantageous when the overshoot drive, a technology that improves the response time of the liquid crystal panel, is used. In the overshoot drive, which is a method of driving liquid crystal, in order to achieve a faster response time, based on a combination of the previous frame input image signal and the current frame input image signal, a drive voltage that is higher (overshot) or lower (undershot) than a predetermined gradation voltage corresponding to the input image signal of the current frame is applied to the liquid crystal display panel. The response characteristic of the liquid crystals is proportional to the square of the cell thickness. Therefore, in the semi-transmissive liquid crystals having a multi-gap structure, the response time of the transmissive region is slow and the response time of the reflective region is fast. Consequently, if the overshoot drive technique is applied to the semi-transmissive liquid crystals having a multi-gap structure, the fast-responding reflective region responds excessively, causing a white flash on the image. One solution to avoid such white flash is to reduce the effect of the overshoot drive, i.e., narrowing the difference between the drive voltage applied to the liquid crystal display panel and the predetermined gradation voltage corresponding to the input image signal of the current frame. This solution, however, cannot achieve sufficient effects of the overshoot drive on the slow-responding transmissive region. Thus, semi-transmissive liquid crystal having a multi-gap structure cannot adequately obtain the fast response time effect of the overshoot drive. The liquid crystal display device of the present invention provides a solution to this problem by not employing the multi-gap structure. This way, the transmissive region and the reflective region can have the same response time, thereby fully benefitting from the effects of the overshoot drive technique.

On the other hand, if a semi-transmissive liquid crystal display device does not employ the multi-gap structure, the gamma characteristics of the reflective display would be different from the gamma characteristics of the transmissive display. Specifically, in the transmissive display, the light from the back enters the liquid crystal display panel and passes through and exits the liquid crystal layer only once, whereas in the reflective display, the light from the front enters the liquid crystal display panel and passes through the liquid crystal layer twice before it finally exits therefrom. Therefore, for the reflective region, the effective retardation (phase difference) calculated from the twice the cell thickness needs to be considered. In the above embodiment, the cell thicknesses of the transmissive region and the reflective region are substantially equal. As a result, if the same drive voltage is applied on the transmissive region and the reflective region, the effective retardation of the reflective region of the liquid crystal layer becomes larger than the effective retardation of the transmissive region of the liquid crystal layer. Therefore, when a voltage-luminance characteristics curve of the reflective display and a voltage-luminance characteristics curve of the transmissive display are plotted on a graph having the voltage applied on the pixel electrode on the horizontal axis and the luminance on the vertical axis, the reflective display curve is steeper than the transmissive display curve. Further, applied voltage Rmax at which the reflective display luminance reaches its local maximum is lower than applied voltage Tmax at which the transmissive display luminance reaches its local maximum, and the reflective display luminance at a voltage higher than Rmax (Tmax, for example) is lower than the reflective display luminance at Rmax. In other words, although the reflective display luminance increases as the applied voltage increases, it reaches its local maximum when the voltage Rmax, which is lower than Tmax, is applied, and then decreases monotonically as the applied voltage increases. Therefore, if the transmissive region and the reflective region have the same cell thickness, driving both the transmissive region and reflective region with the same signal can cause a gradation reversal in the reflective display.

In contrast, in the present invention, gamma characteristics that are not likely to have a gradation reversal can be obtained by adjusting the surface area occupied by the slits in the reflective region without employing the multi-gap structure. The inventors of the present invention found that within the reflective region, voltages are less effectively applied to the liquid crystal layer where the slits are disposed (slit region), as compared with the region where the branch portions of the pixel electrode are disposed, and therefore, the transmittance is lowered even if the slit width is as narrow as 5 μm or less. In the slit region, applied voltage Rmax at which the reflective display luminance reaches its local maximum becomes as high as or higher than voltage Tmax at which the transmissive display luminance reaches its local maximum (Rmax in the slit region≥Tmax>electrode region Rmax). Utilization of this slit region for the reflective display display (by adjusting the surface area occupied by the electrode region and the surface area occupied by the slit region in the reflective region) makes the voltage-luminance characteristics of the reflective display more similar to the voltage-luminance characteristics of the transmissive display even if the same signal voltage is applied to both the transmissive region and the reflective region. Thus, this technique prevents a gradation reversal from occurring in the reflective display. Specifically, the ratio of the surface area occupied by the slits to the entire reflective region is preferably 30% or higher, and more preferably 35% or higher. Adjustment of the surface area occupied by the slits in the reflective region eliminates the need to use separate signal voltages to drive the transmissive region of the liquid crystal and the reflective region of the liquid crystal even when a multi-gap structure is not employed. Therefore, there is no need to use separate thin film transistors (TFT) for the transmissive region and the reflective region, and consequently, a higher aperture ratio can be attained. Since the present invention eliminates the need to employ the multi-gap structure, the manufacturing process can be simplified and the manufacturing cost can be lowered accordingly.

Examples of how to adjust the ratio of the surface area occupied by the slits in the reflective area include: making the electrode in the reflective region narrower than the electrode in the transmissive region; increasing the width of the reflective film around the trunk portion; and disposing a reflective film under the slits.

A preferred example of the aforementioned first substrate has a polymer thereon having a surface structure that determines at least one of the pretilt angles of the liquid crystal molecules and the orientation direction of the liquid crystal molecules upon application of a voltage. The polymer is formed of a polymerizable component added to the liquid crystal layer, which component is polymerized while a voltage is applied to the liquid crystal layer. By this embodiment, the response time of the liquid crystals can be improved without significantly reducing the aperture ratio.

A preferred example of the aforementioned liquid crystal layer is a liquid crystal layer having liquid crystal molecules that are oriented vertically relative to the substrate surface when no voltage is applied and that are oriented horizontally with respect to the substrate surface when a voltage is applied. The display system of the liquid crystal display device using such liquid crystal layer is called the vertical alignment (VA) mode. In order to realize the normally black mode, which can obtain a high contrast ratio, liquid crystal molecules having a negative dielectric constant anisotropy are used. The liquid crystal display device of the present invention may be in the normally black mode (the transmittance or the luminance in the off state is lower than that in the on state) or in the normally white mode (the transmittance or the luminance in the off state is higher than that in the on state).

A preferred example of the aforementioned reflective film utilizes signal wirings. Auxiliary capacity bus lines, gate bus lines, and/or source bus lines may preferably be used. These signal wirings are necessary for driving an active matrix liquid crystal display device. By use of these signal wirings also as a reflective film, there is no need to add the manufacturing process for separate reflective regions as compared with the manufacturing process of a transmissive liquid crystal device. Therefore, the manufacture of the semi-transmissive liquid crystal device can be simplified. Further, by using a reflective film, which is not a pixel electrode, for the reflective display, the same pixel electrode material, such as indium tin oxide (ITO), can be used for the transmissive region and the reflective region. This prevents the flicker phenomenon that is otherwise caused by the difference in the optimum voltage on the opposite electrode for the transmissive display and for the reflective display.

The aforementioned first best-fit curve preferably has a 40 percent or higher reflectance at the 31st gradation in the full scale of 0 to 63 gradations. With less than a 40 percent reflectance at the 31st gradation, which is about the middle in the gradation scale, an inflection point does not exist on the first best-fit curve. With a 40 percent or higher reflectance at the 31st gradation, an inflection point is likely to occur on the first best-fit curve.

The aforementioned first best-fit curve preferably has a 60 percent or less reflectance at the 31st gradation in the full scale of 0 to 63 gradations. When a gradation reversal does not exist, but an inflection point exists on the first best-fit curve, it is difficult to increase the reflectance at the 31st gradation, which is about the middle of the scale, to more than 60%. Therefore, the reflectance at the 31st gradation is preferably 60% or less.

The aforementioned first best-fit curve preferably has the aforementioned inflection point between the 24th and 40th gradations in the full scale of 0 to 63 gradations. Accordingly, the reflectance of the first best-fit curve can readily be adjusted to an appropriate target value (40 to 60% at the 31st gradation). To summarize, the inflection point on the first best-fit curve is preferably between the 24th gradation and the 40th gradation.

A preferred example of the aforementioned pixel electrode is a pixel electrode that includes a transparent conductive film in the transmissive region, and contains a reflective conductive film in the reflective region. The reflective conductive film included in the pixel electrode in the reflective region makes the light passage for the reflective display shorter than when a reflective conductive film is used in a lower layer for the reflective display. Such a reflective conductive film, therefore, prevents the decrease in the reflectance caused by the absorption and interface reflection by the lower layer materials such as transparent resin, and consequently improves the reflectance. As the material for the transparent conductive film, indium tin oxide (ITO), indium zinc oxide (IZO), or zinc oxide, for example, can be used. For the reflective conductive film, aluminum (Al), for example, may be used. The pixel electrode in the reflective region preferably forms a lamination of the aforementioned transparent conductive film and the aforementioned reflective conductive film. The pixel electrode in the reflective region preferably has, as the top layer that faces the liquid crystal layer, a film made of a material whose work function is different from the work function of the transparent conductive film in the transmissive region by less than 0.3 eV. With this structure, the flicker phenomenon that otherwise might occur due to the difference in the optimum voltage on the opposite electrode for the transmissive region and for the reflective region can be prevented. When ITO is used as the transparent conductive film in the transmissive region, as the top layer film of the pixel electrode in the reflective region, the film facing the liquid crystal layer, molybdenum nitride (MoN) or IZO, for example, can be used.

In a preferred embodiment of the liquid crystal display device of the present invention, the width of the slits in the transmissive region is different from the width of the slits in the reflective region. The width of the branch portions of the pixel electrode in the transmissive region and the width of the branch portions of the pixel electrode in the reflective region are preferably different. In this embodiment, pixel electrodes in the transmissive region and pixel electrodes in the reflective region have the same shape. The uniform shape prevents any factors other than the surface area occupied by the slits from causing differences in display quality between the transmissive region and the reflective region. The uniform shape also allows the adjustment of the ratio of surface area occupied by the slits in the transmissive region and in the reflective region by changing the space between the branch portions. Due to this configuration, it is easier to make designs that achieve the desired display quality.

As long as the components are described above, the liquid crystal display device of the present invention is not limited by other components. For example, the liquid crystal display device of the present invention may have, on the back of the backside substrate, a first polarizer and a first $\lambda/4$ retarder, in this order, in the direction from the backside substrate to the liquid crystal layer, the first $\lambda/4$ retarder being positioned so that its retarded phase axis is at an angle of 45 degrees with the absorption axis of the first polarizer; and further may have, on the viewer's side of the viewer side substrate, a second polarizer and a second $\lambda/4$ retarder, in this order in the direction from the viewer side substrate to the liquid crystal layer, the second $\lambda/4$ retarder being positioned so that the absorption axis and retarded phase axis of the second polarizer cross each other at an angle of 45 degrees, and the retarded phase axis of the second $\lambda/4$ retarder crosses the retarded phase axis of the first $\lambda/4$ retarder at an angle of 90 degrees.

Effects of the Invention

The present invention provides a semi-transmissive liquid crystal display device that presents excellent display quality in the reflective display and that can readily be applied to higher image definition devices.

DETAILED DESCRIPTION OF EMBODIMENTS

Embodiments of the present invention are described in detail below. The scope of the present invention, however, shall not be considered to be limited to what the embodiments disclose.

Embodiment 1

In Embodiment 1, the pixel electrode region, the slits region in the pixel electrode, and the contact hole region are used for reflective display, and different gamma characteristics of these three areas are synthesized. As a consequence, the gamma curve of the reflective display has an inflection point, does not have any gradation reversal, and is located above the gamma curve of the transmissive display.

Figure 2:
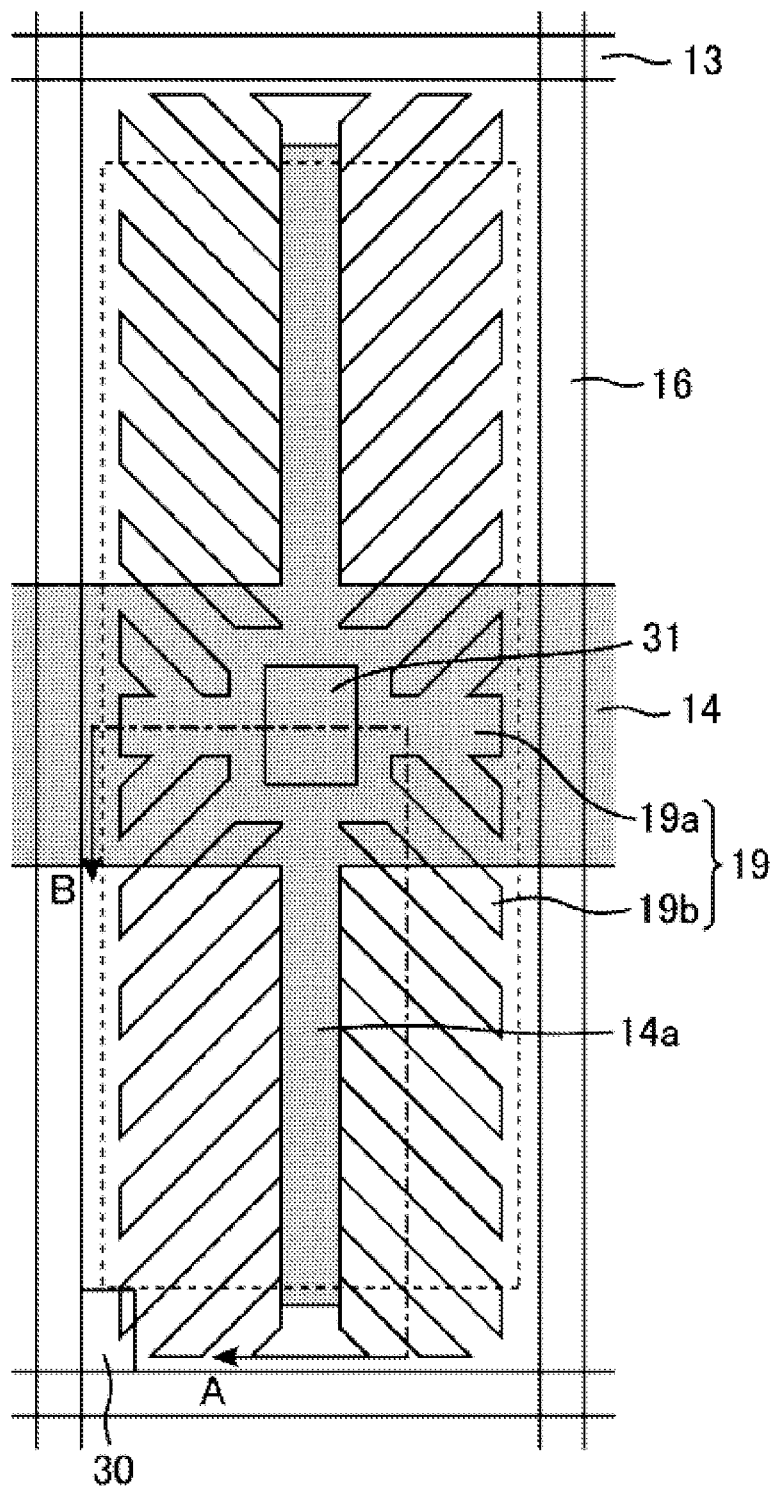
FIG. 2 is a schematic plan view of a pixel of the liquid crystal display device according to Embodiment 1.
Figure 3:
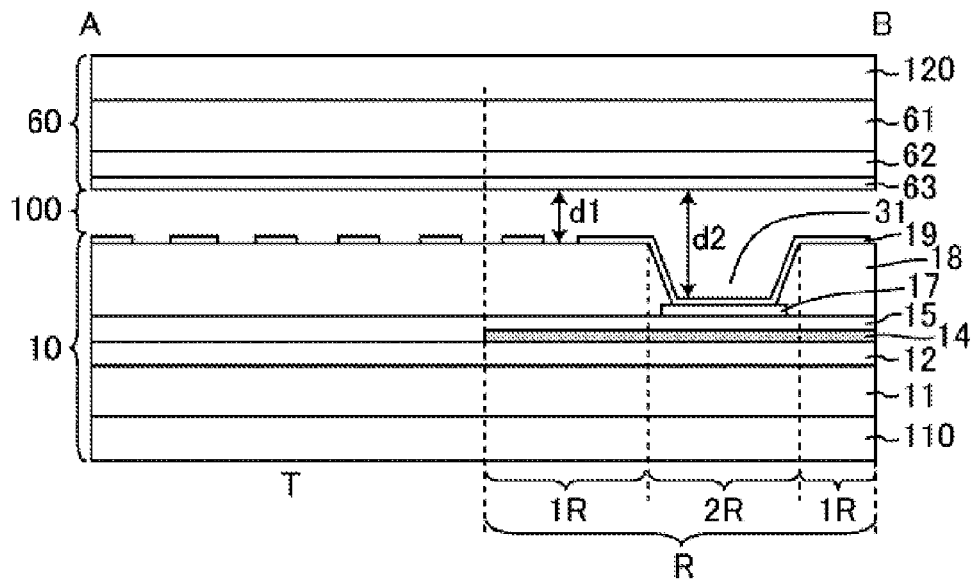
FIG. 3 is a schematic cross-sectional view taken along the line A-B of FIG. 2.

FIG. 2 is a schematic plan view of a pixel of the liquid crystal display device according to Embodiment 1. FIG. 3 is a schematic cross-sectional view taken along the line A-B of FIG. 2.

In this embodiment, a WVGA panel, having a diagonal size of 8 inches (pixel pitch: 72.5 μm×217.5 μm, pixels: 800× RGB×480), was prepared. The liquid crystal display device according to this embodiment includes a backside substrate 10, a viewer-side substrate 60, which opposes the backside substrate 10, and a liquid crystal layer 100, which is held between the backside substrate 10 and the viewer-side substrate 60. The liquid crystal display device according to this embodiment is a semi-transmissive display device, having a transmissive region T and a reflective region R to handle both the transmissive and reflective displays. For transmissive display, the backlight disposed behind the backside substrate 10 is used as the light source. For reflective display, the external light or the front light entering the liquid crystal layer 100 from viewer's side is used as the light source.

As shown in FIG. 2, the backside substrate 10 has a plurality of gate signal lines 13, which are parallel to each other, an auxiliary capacitance (Cs) wiring 14, a plurality of source signal lines 16, which are parallel to each other and cross the gate signal lines 13 and the auxiliary capacitance wiring 14 at a right angle, and a thin film transistor (TFT) 30 at each intersection of the gate signal line 13 and the source signal line 16. The gate signal line 13 is formed with a lamination of TiN, Al and Ti. The source signal line 16 is formed with a lamination of Al and Ti.

TFT 30 has a gate electrode, which is connected to the gate signal line 13, a source electrode, which is connected to the source signal line 16, and a drain electrode 17, which is electrically connected to a pixel electrode 19 through a contact hole 31. The drain electrode 17 is disposed opposing to the auxiliary capacitance wiring 14 through a gate insulating film 15. The auxiliary capacitance (Cs) is formed at the gate insulating film 15, which is disposed between the drain electrode 17 and the auxiliary capacitance wiring 14.

The contact hole 31 is an opening in an interlayer insulating film 18, in which a transparent conductive film constituting the pixel electrode 19 is formed. As shown in FIG. 3, backside substrate 10 has, on a glass substrate 11, a laminated structure of: base coat film 12, gate signal line 13 (auxiliary capacitance wiring 14), gate insulating film 15, source signal line 16 (drain electrode 17), interlayer insulating film 18, pixel electrode 19, and vertical alignment film (not shown), in this order. Contact hole 31, used for electrical connection between drain electrode 17 and pixel electrode 19, forms a dent in the backside substrate 10 on the side that faces the liquid crystal layer 100. In this embodiment, each pixel has one contact hole 31, which is 3.0 μm deep, in the middle of the pixel. However, each pixel may have two or more contact holes 31.

The pixel electrode 19 is composed of a trunk portion 19a, which is cross-shaped and divides the pixel into four regions, and a plurality of branch portions 19b, which branch off from both sides of the trunk portion 19a. Each of the four regions partitioned by the trunk portion 19a has the branch portions 19b that extend to a particular direction, which is different from the directions of the branch portions in other regions. Specifically, if the cross-shaped trunk portion extends at angles of 0°, 90°, 180°, and 270°, then the branch portions in the four regions extend at angles of 45°, 135°, 225°, and 315°. The trunk portion 19a is 3.0 μm wide. Each branch portion 19b is 2.5 μm wide, and the space (slit) between the adjacent branch portions 19b is 2.5 μm wide. The pixel electrode 19 is formed of ITO.

In this embodiment, the auxiliary capacitance wiring 14 also serves as a reflector film that reflects external light. Since using the auxiliary capacitance wiring 14 as a reflector film eliminates the need to form a reflector dedicated for the reflective display, no additional manufacturing steps are required for the semi-transmissive liquid crystal device as compared with the manufacturing methods for a transmissive liquid crystal display device. Similar benefits can be obtained for conductive materials that are separately provided in the same respective layers as the gate signal line 13, the source signal line 16, and respective wirings 13, 14 and 16.

The auxiliary capacitance wiring 14 on the backside substrate 10 has multiple wires disposed in parallel with each other. Pixels in the same row in the matrix share the same auxiliary capacitance wiring 14. The auxiliary capacitance wiring 14 in each pixel has arms 14a that extend in parallel with the source signal line 16 (in the vertical direction in FIG. 1). Other than in the area near the gate signal line 13, the auxiliary capacitance wiring 14 overlaps almost the entire trunk portion 19a of the pixel electrode 19. The auxiliary capacitance wiring 14 also overlaps some of the plurality of branch portions 19b and slits between the branch portions 19b of the pixel electrode 19.

As described above, in this embodiment, the cross-shaped region where the auxiliary capacitance wiring 14 is disposed is used as the reflective region, and the four domains divided by the reflective region are used as the transmissive region. The four domains, each of them being the transmissive region, has the same area ratio within the pixel, which results in a uniform image display having a wide viewing angle. The contact hole 31 is disposed in the reflective region (hole region). Table 1 below shows the area ratios of different regions within a display region (the display region is bounded by a dashed line in FIG. 2).

TABLE 1

| Display region | 8488 | Transmissive region | 5874 | Electrode region | 3926 |
|---|---|---|---|---|---|
| | | | | Slit region | 1948 |
| | | Reflective region | 2614 | Electrode region | 1594 |
| | | | | Slit region | 923 |
| | | | | Hole region | 96 |

As shown in Table 1, the area ratio of the slit region in the transmissive region is 33%, and the area ratio of the slit region in the reflective region is 35%.

On the surface of the vertical alignment film of the backside substrate 10, a polymer that is made by polymerizing multifunctional acrylate monomers (not shown) is formed. This polymer can be formed, for example, in the following manner: (1) the gap between the backside substrate 10 and the viewer-side substrate 60, which are bonded together by a sealing material, is filled with nematic liquid crystal having a negative dielectric constant anisotropy to which 0.3 wt % of multifunctional acrylate monomers having a methacryloyl group have been added; and (2) while an AC voltage of 10 V is applied to the liquid crystal layer 100, the liquid crystal layer 100 is irradiated with a radiation intensity of 25 mW/cm$^2$ and radiation amount of 30 J/cm$^2$ (both with reference to the i-line (365 nm)) of ultraviolet light having a bright line peak at a wavelength between 300 nm and 400 nm). Monomers remaining in the liquid crystal layer 100 can be removed by exposing the liquid crystal layer 100 under fluorescent light for 48 hours, without any voltage applied to the liquid crystal layer 100. The polymer formed in the method described above has a surface structure that determines either the pretilt angle and/or alignment orientation upon a voltage application of liquid crystal molecules in the liquid crystal layer 100.

On the other hand, the viewer-side substrate 60 has, on the glass substrate 61, a laminated structure of: color filter layer 62, which includes a coloring layer and a black matrix (BM), opposite electrode 63, and a vertical alignment film (not shown), in this order. The coloring layer has red (R), green (G) and blue (B) components, which are disposed on the backside substrate 10, to correspond to the pixel electrodes 19. The opposite electrode 63 is not formed individually for each pixel, but is an electrode (common electrode) corresponding to the plurality of pixels. Opposite electrode 63 is formed of ITO.

On the back side of the glass substrate 11 of the backside substrate 10, and on the viewer's side of the glass substrate 61 of the viewer-side substrate 60, circularly polarizing plates 110 and 120, both having a laminated structure of a polarizer and a λ/4 retarder, are bonded respectively. For both the circularly polarizing plates 110 and 120, the absorption axis of the polarizer and the delayed phase axis of the λ/4 retarder cross each other at an angle of 45 degrees. The absorption axes of the polarizers of circularly polarizing plates 110 and 120 cross each other at an angle of 90 degrees.

The display mode of the liquid crystal display device according to this embodiment is a vertical alignment (VA) mode. Liquid crystal layer 100 is constituted of nematic liquid crystal having a negative dielectric constant anisotropy. When no voltage is applied (OFF state), liquid crystal molecules in liquid crystal layer 100 are aligned vertically to the surface of the alignment films of the substrate 10 and the substrate 60. When a voltage is applied (ON state), the liquid crystal molecules tilt toward the horizontal position. The thickness of the liquid crystal layer 100 in the transmissive region T, i.e., the cell gap (cell thickness) d1, is 3.2 μm. The refractive index anisotropy Δn of the liquid crystal material is 0.098, and the product of the refractive index anisotropy Δn of the liquid crystal material and the cell gap "d" is 314 nm.

According to this embodiment, the cell gap of the transmissive region T is constant throughout the region. Whereas in the reflective region R, there are two different cell gaps: cell gap "d1" in the electrode region (the region where the pixel electrode is formed) and in the slit region (the region where the slits are formed), which is equal to the cell gap of the transmissive region T, and cell gap "d2" in the hole region, which is greater than the cell gap in the transmissive region T (d1<d2). Since the thickness of the pixel electrode 19 is 1400 Å, which is significantly thinner than the cell gap, which is 3.2 μm, and than the depth of the hole region (contact hole 31), which is 3.0 μm, the effect that the difference in cell gap between the electrode region and slit region has on the voltage-luminance characteristics (gamma characteristics) is negligible. In this embodiment, the electrode region and the slit region, whose cell gaps are both "d1", are called the first zone 1R, and the hole region, whose cell gap is "d2", is called the second zone 2R.

As described above, the effect that the difference in the cell gap between the electrode region and the slip region has on the voltage-luminance characteristics (gamma characteristics) is negligible. Actually, however, the reflective display light in the electrode region and the reflective display light in the slit region are different. The reason is that the voltage applied on the liquid crystal layer 100 in the slit region is lower than in the electrode region, and therefore, the effective retardation of the liquid crystal layer 100 in the slit region is smaller than in the electrode region. In the reflective region R, as discussed above, the reflective display lights in the electrode region, the slit region, and the hole region have different characteristics. The combination of these three lights is used in the reflective display. That is, the gamma curve of the reflective display depends on the area ratio of the electrode region, the slit region and the hole region in the reflective region R. Therefore, in order to obtain the first best-fit curve (i) that has no gradation reversal, (ii) has an inflection point, and (iii) that is above the second best-fit curve except in the regions where the reflectance of the first best-fit curve and the transmittance of the second best-fit curve are both 0% and 100%, the ratio of surface area occupied by the slits in the reflective region R is preferably 30% or higher, and more preferably 35% or higher.

In this embodiment, the first best-fit curve is located above the second best-fit curve, and the first best-fit curve has at least one inflection point. Also, gradation reversal, an unfavorable property, does not appear in the first best-fit curve.

Figure 1:
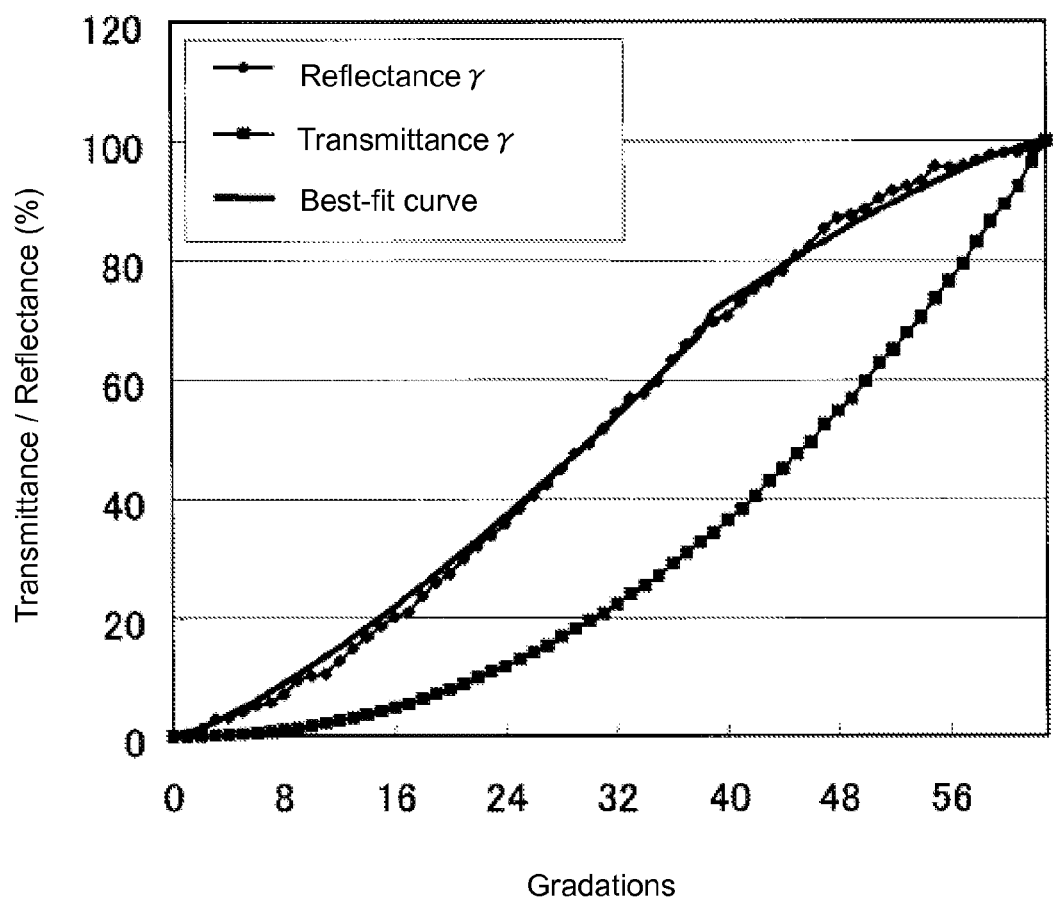
FIG. 1 is a graph showing the measurement results of the gamma characteristics of the reflective display and the transmissive display of a liquid crystal display device according to Embodiment 1.

The gamma characteristics were measured for the reflective display and the transmissive display of the liquid crystal display device of Embodiment 1. The measurement results are shown in FIG. 1. The reflectance and the transmittance shown in FIG. 1 indicate the luminance ratios when the maximum brightness in each display is regarded as 100%. Note that, in FIG. 1, only the first best-fit curve is shown, and the second best-fit curve is not shown.

As shown in FIG. 1, the first best-fit curve obtained from the gamma curve of the reflective display is above the second best-fit curve obtained from the gamma curve of the transmissive display, except in the regions where the reflectance of the first best-fit curve and the transmittance of the second best-fit curve both are 0% and 100%. The first best-fit curve monotonically increases in the range from 0% to 100% of the reflectance, indicating that the first best-fit curve does not have any gradation reversal. Furthermore, an inflection point is present at the 39th gradation (in a 64 gradation scale) of the first best-fit curve, where the curve is convex down when the gradations are below the inflection point, and convex up when the gradations are above the inflection point. The gamma value (γt) of the transmissive display is 2.2, and the gamma value (γr) of the reflective display is 1.25.

In FIG. 1, the function of the first best-fit curve in the low-gradation side of the inflection point is expressed in equation (1) below, and the function of the first best-fit curve in the high-gradation side of the inflection point is expressed in equation (2) below.

Equation 1
$$R \propto \left(\frac{L}{63}\right)^{\gamma r} \quad (1)$$

Equation 2
$$R \propto 1 - \left(\frac{(63-L)}{63}\right)^{\gamma r} \quad (2)$$

In the equations (1) and (2) above, R represents the reflectance, and L represents the gradation.

Here, the gamma values of the reflective display are preferably set so that the reflectance of the first best-fit curve at the 31st gradation is 40 to 60%. Such setting is preferable, because, if the reflectance at the 31st gradation, which is located near the middle of the entire gradation scale, is below 40%, the gamma curve of the reflective display does not have an inflection point. Also, if the first best-fit curve does not have gradation reversal and has an inflection point, it is difficult to set the reflectance at the 31st gradation, which is located near the middle of the entire gradation scale, above 60%. Therefore, by setting the reflectance at the 31st gradation to 40% or higher, an inflection point is likely to exist on the gamma curve of the reflective display. Also, by setting the reflectance at the 31st gradation to 60% or below, the gamma characteristics can be easily modified using the cell thickness as the factor. Having an inflection point between the 24th gradation and the 40th gradation, as in this embodiment, the reflectance can easily be set to the preferable target value (the reflectance of 40 to 60% at the 31st gradation). To summarize, the inflection point on the first best-fit curve is preferably between the 24th gradation and the 40th gradation.

In conventional technologies, the gamma value of both the reflective display and the transmissive display are often set to 2.2, and consequently, the reflectance corresponding to the 31st gradation is as low as 21%. For this reason, the reflective display of conventional liquid crystal display devices is darker than the transmissive display. The liquid crystal display device of this embodiment, however, provides a reflective display that is brighter than that of the conventional devices, by lowering the gamma value of the reflective display lower than that of the transmissive display.

In this embodiment, the first best-fit curve is above the second best-fit curve except in the regions where the reflectance and the transmittance are both 0% and 100%, and the first best-fit curve does not have a gradation reversal and has an inflection point. The result is a brighter image of the low luminance area in the reflective display, producing enhanced reflective display images. The appearance of the contrast of reflective display image is thus improved.

Since such gamma characteristics of the reflective display and transmissive display can be achieved by adjusting the cell thickness the area of the electrode region, the area of the slit region, and the area of the hole region, there is no need to provide a complex structure that would otherwise be required for separate display data processing and/or separate supply reference voltages for the reflective display and for the transmissive display.

In particular, in FIG. 1, the curve represented by equation (1), which is convex down, and the curve represented by equation (2), which is convex up, are continuously connected at the inflection point to yield the first best-fit curve. This results in a brighter image than in the conventional technologies in the lower gradation side of the inflection point. Thus, the display quality of the reflective display becomes closer to that of the transmissive display. Since there is no gradation reversal in the high-gradation area, the reflective display also does not produce abnormal display. The image in the reflective display therefore is greatly enhanced.

The display quality improvement discussed above is achieved by raising the luminance of only low-gradation area, i.e., the darker side of the scale. This means that there is no major difference in the display quality between the transmissive display and the reflective display even when the display is exposed to full ambient light. Even when the external light radiates a part of the screen surface, the overall display quality remains good, since the display quality of the reflective display is close to that of the transmissive display. Good display quality is thus obtained in both the transmissive and reflective displays. Higher image definition can also be attained with relative ease, as compared with MVA-LCD.

In this embodiment, the cell gap in the transmissive region T and the cell gap in most parts of the reflective region R (the first zone 1R) are equal. This makes the response time of the liquid crystal molecules in the transmissive region T and the response time of the liquid crystal molecules in the reflective region R equal, which also makes the overshoot drive condition of the transmissive region T and the overshoot drive condition of the reflective region R equal. Therefore, the response time of liquid crystal molecules can be easily improved by the overshoot drive. This also eliminates the need to add a manufacturing process for forming a multi-gap structure.

Furthermore, in this embodiment, the same material can be used for the pixel electrode 19 for the transmissive region T and for the reflective region R. Therefore, flicker phenomenon due to the difference in the optimal voltage on the opposite electrode for the transmissive region T and for the reflective region R—the difference resulting from the pixel material difference between the two regions—can be effectively reduced.

In this embodiment, because the regions where the branch portions and the slits are alternately disposed are used as the display region, the surface area needed for orientation control means is reduced. In the liquid crystal display device of this embodiment, the aperture ratio in the transmissive region is 37.3%, and the aperture ratio in the reflective region is 16.6%, summing up to a total aperture ratio of 53.9%.

Figure 4:
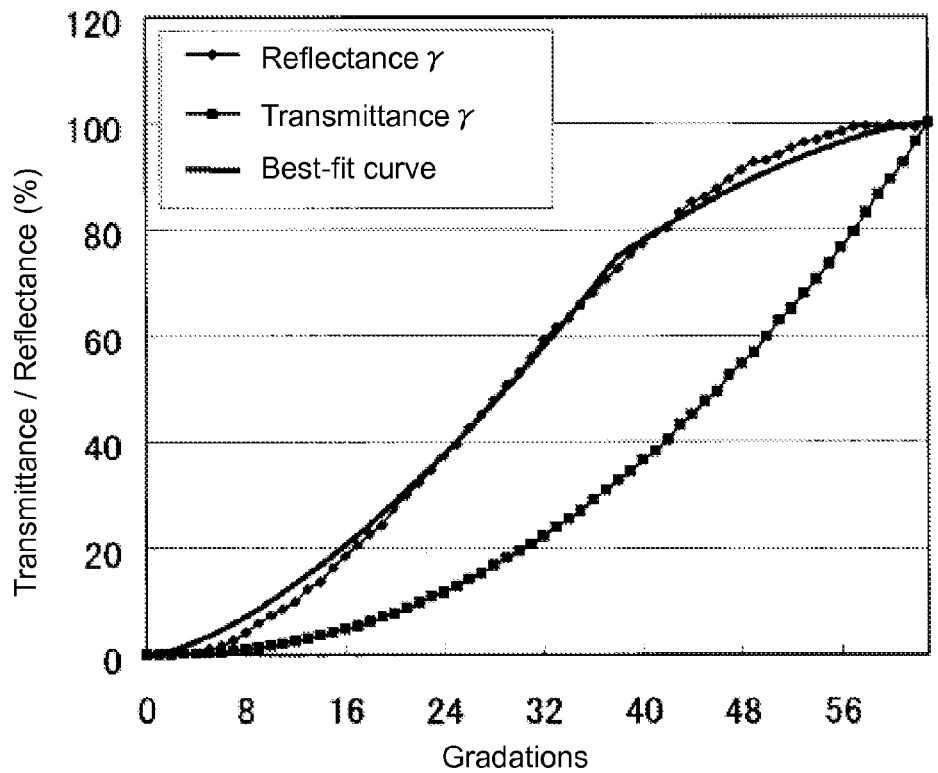
FIG. 4 is a graph showing the gamma characteristics of the reflective display and the transmissive display of another liquid crystal display device according to Embodiment 1 (depth of contact hole 31: 0.5 μm).

FIG. 4 shows the gamma characteristics of the reflective and transmissive displays of a liquid crystal display according to a variation of Embodiment 1, which was manufactured by changing only the depth of the contact hole 31. In this variation of Embodiment 1, the depth of the contact hole 31 was changed from 3.0 μm to 0.5 μm. The reflectance and the transmittance in FIG. 4 are the luminance ratios when the maximum brightness in each display is regarded as 100%. Note that, in FIG. 4, only the first best-fit curve is shown, and the second best-fit curve is not shown.

In FIG. 4, the gamma value (γt) of the transmissive display is 2.2, and the gamma value (γr) of the reflective display is 1.5. The first best-fit curve has an inflection point at the 39th gradation in the 64 gradation scale. Compared to the first best-fit curve in FIG. 1, the first best-fit curve in FIG. 4, which is the result of the change in the depth of contact hole 31 from 3.0 µm to 0.5 µm, shows lower reflectance percentages in the low-gradation side of the inflection point, and higher reflectance percentages in the high-gradation side of the inflection point. The first best-fit curve in FIG. 4 does not have a gradation reversal, but almost exhibits gradation reversal in the gradation area higher than the 56th gradation. This result indicates that when contact hole 31 is shallower than 0.5 µm, the first best-fit curve is most likely to have a gradation reversal. The depth of contact hole 31, therefore, is preferably 0.5 µm or more.

Figure 5:
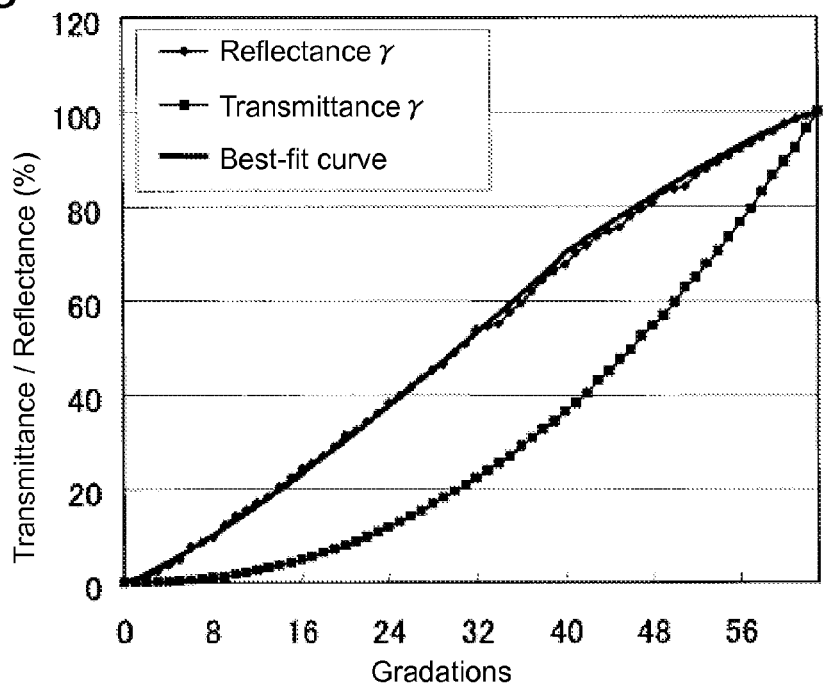
FIG. 5 is a graph showing the measurement results of the gamma characteristics of the reflective display and the transmissive display of yet another liquid crystal display device according to Embodiment 1 (the ratio of surface area occupied by the slits in the entire reflective region R: 40%).
Figure 6:
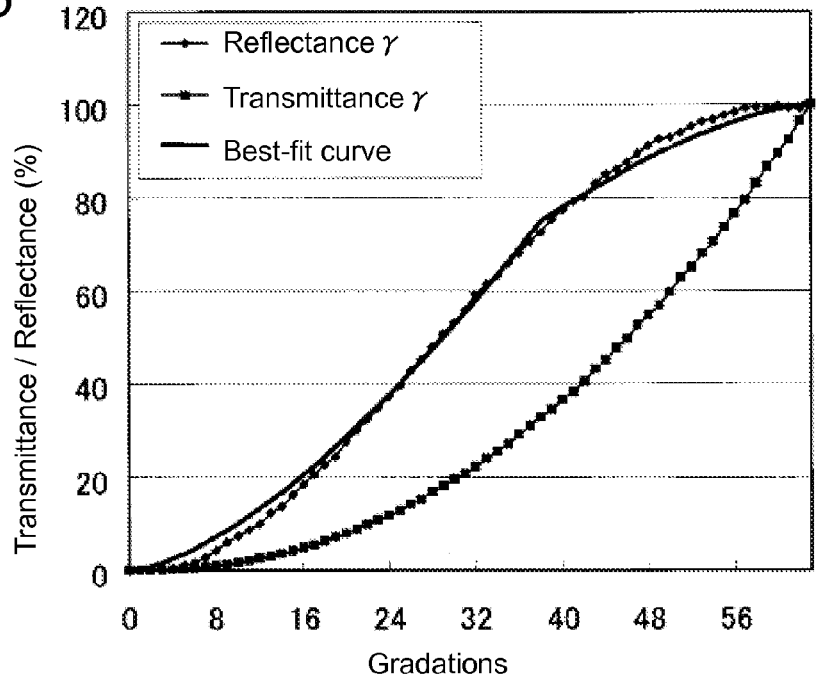
FIG. 6 is a graph showing the measurement results of the gamma characteristics of the reflective display and the transmissive display of yet another liquid crystal display device according to embodiment 1 (the ratio of surface area occupied by the slits in the entire reflective region R: 30%).
Figure 7:
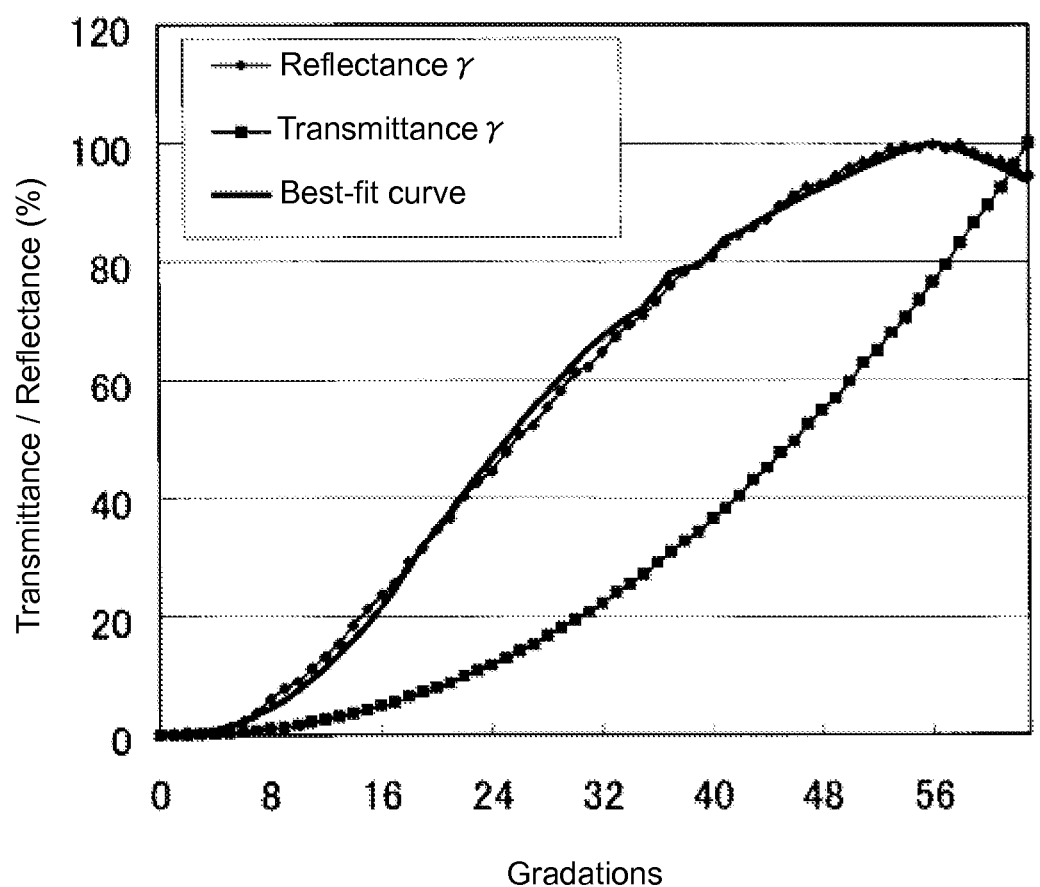
FIG. 7 is a graph showing the measurement results of the gamma characteristics of the reflective display and the transmissive display of yet another liquid crystal display device according to Embodiment 1 (the ratio of surface area occupied by the slits in the entire reflective region R: 25%).

FIGS. 5 to 7 show the measurement results of the gamma characteristics of the reflective and transmissive displays of liquid crystal displays according to other variations of Embodiment 1, which were manufactured by changing only the ratio of the surface area occupied by the slits relative to the entire reflective region R. The reflectance and the transmittance in FIGS. 5 to 7 are the luminance ratios when the maximum brightness in each display is regarded as 100%. Note that, in FIGS. 5 to 7, only the first best-fit curve is shown, and the second best-fit curve is not shown. The ratio of the surface area occupied by the slits relative to the entire reflective region R was changed by changing the slit width.

FIG. 5 shows the results in the case where the ratio of the surface area occupied by the slits relative to the entire reflective region R area was changed from 35% to 40%. In FIG. 5, the gamma value (γt) of the transmissive display is 2.2, and gamma value (γr) of the reflective display is 1.15. The first best-fit curve has an inflection point at the 38th gradation in the 64 gradation scale. Compared to the first best-fit curve in FIG. 1, the first best-fit curve in FIG. 5, which is the result of changing the ratio of the surface area occupied by the slits to the entire reflective region R from 35% to 40%, shows higher reflectance percentages in the low-gradation side of the inflection point, and lower reflectance percentages in the high-gradation side of the inflection point.

FIG. 6 shows the results in the case where the ratio of the surface area occupied by the slits relative to the entire reflective region R was changed from 35% to 30%. In FIG. 6, the gamma value (γt) of the transmissive display is 2.2, and the gamma value (γr) of the reflective display is 1.5. The first best-fit curve has an inflection point at the 39th gradation in the 64 gradation scale. Compared to the first best-fit curve in FIG. 1, the first best-fit curve in FIG. 6, which is the result of changing the ratio of the surface area occupied by the slits to the entire reflective region R from 35% to 30%, shows lower reflectance percentages in the low-gradation side of the inflection point, and higher reflectance percentages in the high-gradation side of the inflection point. As in FIG. 4, the first best-fit curve in FIG. 6 does not have a gradation reversal, but almost exhibits gradation reversal at gradations higher than the 56th gradation.

FIG. 7 shows the result in the case where the ratio of the surface area occupied by the slits relative to the entire reflective region R was changed from 35% to 25%. The first best-fit curve in FIG. 7 has an inflection point at the 42th gradation in the 64 gradation scale. As shown in FIG. 7, the first best-fit curve indicates a gradation reversal at gradations higher than the 56th gradation, where the reflectance declines after reaching its peak, which is the result of reducing the ratio of the surface area occupied by the slits in the entire reflective region R from 35% to 25%. Therefore, the ratio of surface area occupied by the slits in the entire reflective region R is preferably 30% or higher, and more preferably 35% or higher.

Embodiment 2

Figure 8:
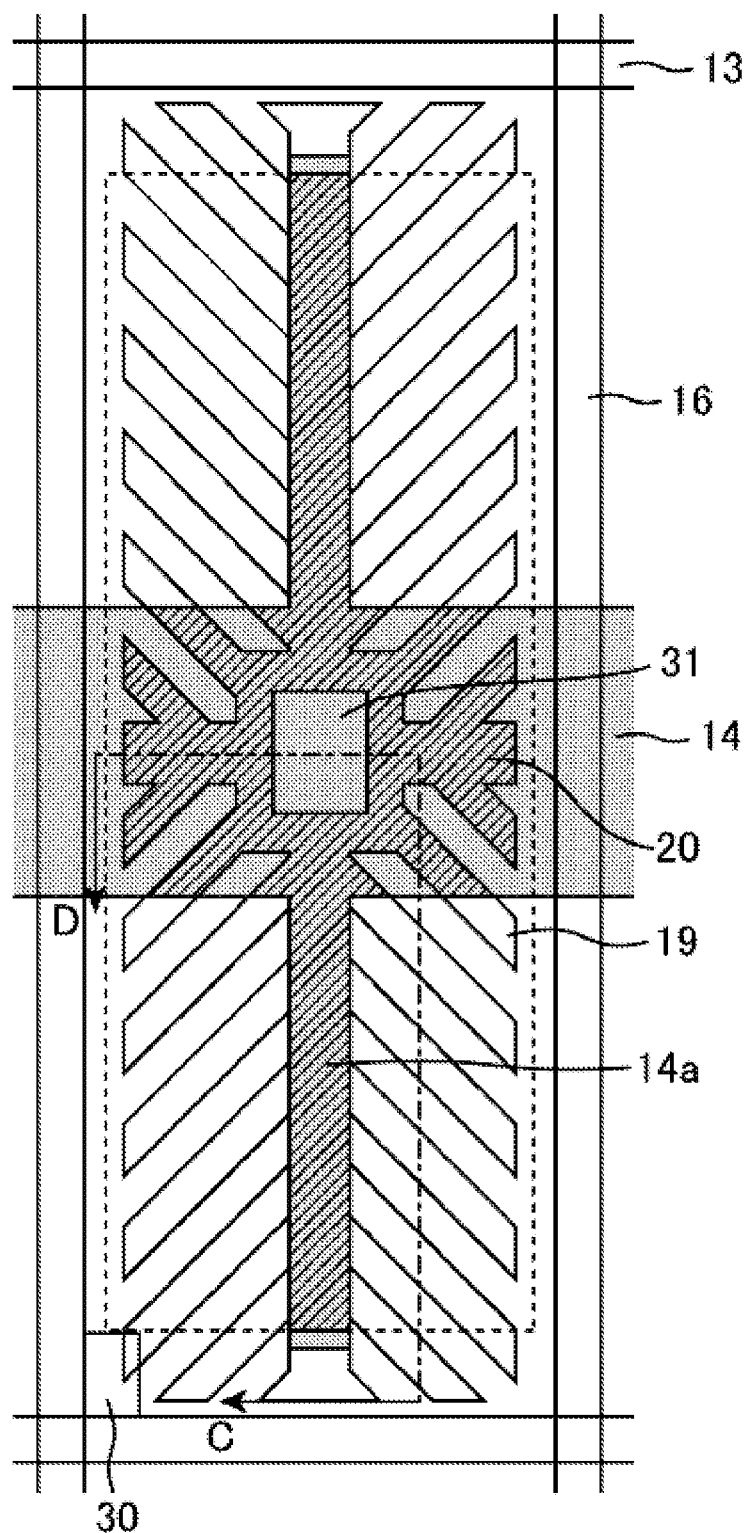
FIG. 8 is a schematic plan view of a pixel of the liquid crystal display device according to Embodiment 2.
Figure 9:
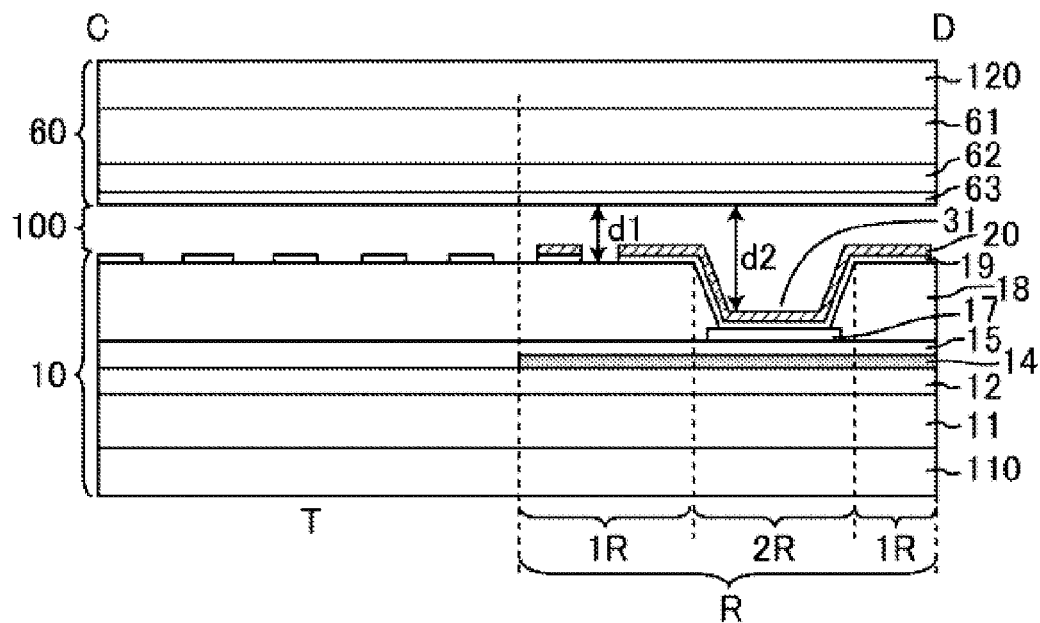
FIG. 9 is a schematic cross-sectional view taken along the line C-D of FIG. 8.

FIG. 8 is a schematic plan view of a pixel of a liquid crystal display device according to Embodiment 2. FIG. 9 is a schematic cross-sectional view taken along the line C-D of FIG. 8. In Embodiment 1, ITO film 19 is used for the pixel electrode for both the transmissive and reflective regions. In contrast, in Embodiment 2, ITO film 19 (work function: 4.9 eV) is used as the transmissive electrode in the transmissive region T, and in the reflective region R, a laminated film made by laminating an Al film (work function: 4.3 eV) on the ITO film 19 is used as the reflective electrode. The reflective electrode is 1500 Å thick. Other than this, Embodiment 2 has the same structure as Embodiment 1.

In this embodiment, the reflective region R has an reflective electrode containing a reflective Al film 20, which shortens the light passage for reflective display, and therefore provides higher reflectance percentages. The display quality of the reflective display is thus improved. The reflective electrode of this embodiment is not particularly limited, as long as a film made of conductive material having reflective property is used. Any conductive film having a reflective property may replace the Al film 20 for the laminated structure.

Embodiment 3

Figure 10:
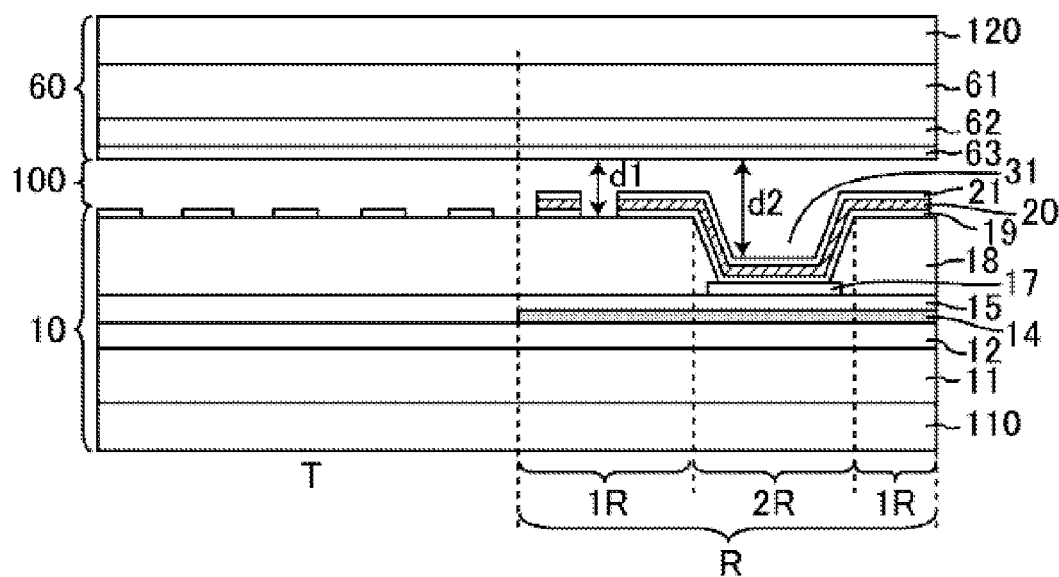
FIG. 10 is a schematic cross-sectional view of the liquid crystal display device according to Embodiment 3.

FIG. 10 is a schematic cross-sectional view of the pixel of a liquid crystal display device according to Embodiment 3. The liquid crystal display device of this embodiment has the same structure as the liquid crystal display device of Embodiment 2 except that MoN film 21 (work function: 4.7 eV) is disposed over the Al film 20. In other words, the reflective electrode has a three-layered structure having ITO film 19, Al film 20, and MoN film 21 layered in this order. The MoN film 21 is 50 Å thick.

In this embodiment, the difference in the work function between the ITO film 19 (work function: 4.9 eV) and the MoN film 21 (work function: 4.7 eV) is only 0.2 eV. This means that the flicker phenomenon caused by the difference in the optimum voltage on the opposite electrode for the transmissive electrode and for the reflective electrode can be suppressed. The film constituting the top surface of the reflective electrode that faces the liquid crystal layer may be an IZO film (work function: 4.8 eV). The IZO film may be, for example, 100 Å thick.

In Embodiments 1 to 3, there have been described examples in which the width of the branch portions 19b of the pixel electrode 19 in the transmissive region T and that in the reflective region R are the same, and the width of the slits of the pixel electrode 19 in the transmissive region T and that in the reflective region R are the same. However, the width of the slits in the transmissive region T and that in the reflective region R may be different. In such a case, the formation of the pixel electrode 19 in the transmissive region T and the pixel electrode 19 in the reflective region R into the same shape can prevent any factors other than the ratio of the surface area occupied by the slits from causing differences in display quality between the transmissive region T and the reflective region R, and makes it possible to adjust the ratio of the surface area occupied by the slits in the transmissive region T and in the reflective region R by changing the space between the branch portions 19b. Due to this configuration, it is easier to make designs that achieve the desired display quality. This embodiment can easily be realized by changing the width of the branch portions 19b of the pixel electrode 19 between the transmissive region T and the reflective region R.

The present application claims priority to Patent Application No. 2008-211778 filed in Japan on Aug. 20, 2008 under the Paris Convention and provisions of national law in a designated State, the entire contents of which are hereby incorporated by reference.

DESCRIPTION OF REFERENCE CHARACTERS 10 backside substrate
11 glass substrate
12 base coat film
13 gate signal line
14 auxiliary capacitance wiring
14a auxiliary capacitance wiring arm
15 gate insulating film
16 source signal line
17 drain electrode
18 interlayer insulating film
19 pixel electrode (ITO film)
19a trunk portion of pixel electrode
19b branch portion of pixel electrode
20 Al film
21 MoN film
30 thin film transistor
31 contact hole
60 viewer-side substrate
61 glass substrate
62 color filter layer
63 opposite electrode
100 liquid crystal layer
110, 120 circularly polarizing plate
R reflective region
R1 first zone
R2 second zone
T transmissive region

The invention claimed is:

1. A liquid crystal display device, comprising a first substrate, a liquid crystal layer and a second substrate, in this order,
wherein said first substrate has a pixel electrode having a trunk portion and a plurality of branch portions branching off from the trunk portion,
wherein said liquid crystal display device has a display region including a region where said branch portions and slits are alternately disposed,
wherein said display region includes a reflective region and a transmissive region,
wherein said reflective region has said pixel electrode, a reflective film disposed under said pixel electrode, and a λ/4 retarder plate,
wherein a first best-fit curve obtained from a gamma curve of a reflective display is located above a second best-fit curve obtained from a gamma curve of a transmissive display except in regions where a reflectance of said first best-fit curve and a transmittance of said second best-fit curve are 0% and 100%,
wherein said first best-fit curve does not have a gradation reversal and has an inflection point, and
wherein said first best-fit curve indicates 40 percent of the reflectance or higher at a 31st gradation in a full scale of 0 to 63 gradations.

2. The liquid crystal display device according to claim 1, wherein said first best-fit curve indicates 60 or lower percent of the reflectance at a 31st gradation in a full scale of 0 to 63 gradations.

3. The liquid crystal display device according to claim 2, wherein said reflective region has a portion in which a cell thickness is substantially equal to a cell thickness of said transmissive region.

4. The liquid crystal display device according to claim 2, wherein a ratio of a surface area occupied by said slits to an entirety of said reflective region is 30% or more.

5. The liquid crystal display device according to claim 2, wherein said first substrate has thereon a polymer having a surface structure that determines at least one of pretilt angles of liquid crystal molecules in said liquid crystal layer and orientation directions of liquid crystal molecules in said liquid crystal layer upon application of a voltage, and
wherein said polymer is formed by polymerizing an polymerizable component added to said liquid crystal layer while a voltage is applied to said liquid crystal layer.

6. The liquid crystal display device according to claim 2, wherein said liquid crystal layer has liquid crystal molecules that are oriented vertically to a substrate surface when no voltage is applied and that are oriented horizontally with respect to the substrate surface when a voltage is applied.

7. The liquid crystal display device according to claim 2, wherein said reflective film is an auxiliary capacitance bus line, a gate bus line or a source bus line.

8. The liquid crystal display device according to claim 2, wherein a width of said slit in said transmissive region is different from a width of said slit in said reflective region.

9. The liquid crystal display device, comprising a first substrate, a liquid crystal layer and a second substrate, in this order,
wherein said first substrate has a pixel electrode having a trunk portion and a plurality of branch portions branching off from the trunk portion,
wherein said liquid crystal display device has a display region including a region where said branch portions and slits are alternately disposed,
wherein said display region includes a reflective region and a transmissive region,
wherein said reflective region has said pixel electrode, a reflective film disposed under said pixel electrode, and a λ/4 retarder plate,
wherein a first best-fit curve obtained from a gamma curve of a reflective display is located above a second best-fit curve obtained from a gamma curve of a transmissive display except in regions where a reflectance of said first best-fit curve and a transmittance of said second best-fit curve are 0% and 100%,
wherein said first best-fit curve does not have a gradation reversal and has an inflection point, and
wherein said first best-fit curve has an inflection point between a 24th gradation and a 40th gradation in a full scale of 0 to 63 gradations.

10. The liquid crystal display device according to claim 9, wherein said reflective region has a portion in which a cell thickness is substantially equal to a cell thickness of said transmissive region.

11. The liquid crystal display device according to claim 9, wherein a ratio of a surface area occupied by said slits to an entirety of said reflective region is 30% or more.

12. The liquid crystal display device according to claim 9, wherein said liquid crystal layer has liquid crystal molecules that are oriented vertically to a substrate surface when no voltage is applied and that are oriented horizontally with respect to the substrate surface when a voltage is applied.

13. The liquid crystal display device according to claim 9, wherein a width of said slit in said transmissive region is different from a width of said slit in said reflective region.

14. A liquid crystal display device, comprising a first substrate, a liquid crystal layer and a second substrate, in this order,
wherein said first substrate has a pixel electrode having a trunk portion and a plurality of branch portions branching off from the trunk portion,
wherein said liquid crystal display device has a display region including a region where said branch portions and slits are alternately disposed,
wherein said display region includes a reflective region and a transmissive region,
wherein said reflective region has said pixel electrode, a reflective film disposed under said pixel electrode, and a $\lambda/4$ retarder plate,
wherein a first best-fit curve obtained from a gamma curve of a reflective display is located above a second best-fit curve obtained from a gamma curve of a transmissive display except in regions where a reflectance of said first best-fit curve and a transmittance of said second best-fit curve are 0% and 100%,
wherein said first best-fit curve does not have a gradation reversal and has an inflection point,
wherein said pixel electrode in said transmissive region includes a transparent conductive film, and said pixel electrode in said reflective region includes a reflective conductive film, and
wherein said pixel electrode in said reflective region has, on the top surface facing said liquid crystal layer, a film made of a material whose work function is different from the work function of said transparent conductive film in said transmissive region by less than 0.3 eV.

15. The liquid crystal display device according to claim 14, wherein said pixel electrode in said reflective region has a laminated structure comprising said transparent conductive film and said reflective conductive film.

16. The liquid crystal display device according to claim 14, wherein said reflective region has a portion in which a cell thickness is substantially equal to a cell thickness of said transmissive region.

17. The liquid crystal display device according to claim 14, wherein a ratio of a surface area occupied by said slits to an entirety of said reflective region is 30% or more.

18. The liquid crystal display device according to claim 14, wherein said first substrate has thereon a polymer having a surface structure that determines at least one of pretilt angles of liquid crystal molecules in said liquid crystal layer and orientation directions of liquid crystal molecules in said liquid crystal layer upon application of a voltage, and
wherein said polymer is formed by polymerizing an polymerizable component added to said liquid crystal layer while a voltage is applied to said liquid crystal layer.

19. The liquid crystal display device according to claim 14, wherein said liquid crystal layer has liquid crystal molecules that are oriented vertically to a substrate surface when no voltage is applied and that are oriented horizontally with respect to the substrate surface when a voltage is applied.

20. The liquid crystal display device according to claim 14, wherein a width of said slit in said transmissive region is different from a width of said slit in said reflective region.

* * * * *